United States Patent
Degen et al.

(10) Patent No.: US 9,923,471 B2
(45) Date of Patent: Mar. 20, 2018

(54) DC-DC CONVERTERS HAVING A HALF-BRIDGE NODE, CONTROLLERS THEREFOR AND METHODS OF CONTROLLING THE SAME

(71) Applicant: NXP B.V., Eindhoven (NL)

(72) Inventors: Peter Theodorus Johannes Degen, Arnhem (NL); Henricus Theodorus Petrus Johannes van Elk, Ravenstein (NL)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 15/292,529

(22) Filed: Oct. 13, 2016

(65) Prior Publication Data
US 2017/0110971 A1  Apr. 20, 2017

(30) Foreign Application Priority Data
Oct. 15, 2015 (EP) .................................. 15190018

(51) Int. Cl.
*H03K 17/0812* (2006.01)
*H02M 3/335* (2006.01)
(Continued)

(52) U.S. Cl.
CPC ......... *H02M 3/33507* (2013.01); *H02M 1/32* (2013.01); *H02M 2001/327* (2013.01)

(58) Field of Classification Search
CPC ......... H02M 2001/0003; H02M 3/156; H02M 3/157; H03K 3/012; H03K 17/0812; H03K 17/082; H03K 17/08; H03K 17/284
See application file for complete search history.

(56) References Cited

U.S. PATENT DOCUMENTS

| | | | | |
|---|---|---|---|---|
| 7,911,255 B2* | 3/2011 | Ochi | ..................... | H03F 3/2173 323/312 |
| 8,044,699 B1* | 10/2011 | Kelly | ............... | H03K 19/01753 327/333 |

(Continued)

FOREIGN PATENT DOCUMENTS

GB     2244400 A    11/1991

OTHER PUBLICATIONS

Fairchild Semiconductor; "FAN7361, FAN7362 High-Side Gate Driver"; Retrieved from the Internet: www.fairchildsemi.com/datasheets/FA/FAN7361.pdf [retrieved on Apr. 21, 2016]; 9 pages (Nov. 11, 2009).

(Continued)

*Primary Examiner* — Gary L Laxton

(57) ABSTRACT

There is disclosed a controller for a DC-DC converter comprising a series arrangement of a high-side switch and low-side switch with a half-bridge node therebetween, the controller comprising a high-side part for driving the high-side switch and configured to be powered, when the low-side switch is open, by a rechargeable power supply connected between the half-bridge node and a power supply node, the high-side part comprising a level shifter, driver, latch part comprising a latch having set and reset inputs and configured to latch the driver to either an on-state or an off-state, and a further circuit, wherein the latch part is configured and adapted to prevent the further circuit from drawing current from the power supply unless at least one of the set input is high and the driver is in the on-state. A DC-DC converter having such a controller is also disclosed, as are methods of operating a converter.

15 Claims, 7 Drawing Sheets

(51) Int. Cl.
*H02M 1/32* (2007.01)
*H02M 3/157* (2006.01)

(56) References Cited

U.S. PATENT DOCUMENTS

| | | | | |
|---|---|---|---|---|
| 2004/0032288 A1* | 2/2004 | Green | .............. | H03K 17/08122 |
| | | | | 327/109 |
| 2008/0258808 A1 | 10/2008 | Locatelli et al. | | |
| 2012/0176167 A1 | 7/2012 | Lee et al. | | |
| 2013/0207704 A1 | 8/2013 | Tseng et al. | | |
| 2016/0079979 A1* | 3/2016 | Kinzer | .................. | H02J 7/0052 |
| | | | | 323/312 |
| 2016/0197614 A1* | 7/2016 | Akahane | .......... | H03K 17/04123 |
| | | | | 327/109 |

OTHER PUBLICATIONS

Fairchild; "AN-8102 Recommendations to Avoid Short Pulse Width Issues in HVIC Gate Driver Applications"; Retrieved from the Internet: https://www.fairchildsemi.com/application-notes/AN/AN-810 2.pdf [retrieved on Apr. 21, 2016]; 5 pages (Apr. 28, 2015).
Sedra, Adel et al; "Chapter 15—Memory Circuits"; Microelectronic Circuits (6th Edition; Oxford University Press; 50 pages (Dec. 15, 2009).
Extended European Search Report for Patent Appln. No. 15190018.0 (dated May 4, 2016).
MPS; "HR1000 Resonant Half-Bridge Controller"; Retrieved from the Internet: www.monolithicpower.com/DesktopModules/DocumentManage/API/Document/GetDocument?id=1700 [retrieved on Apr. 21, 2016]; 23 pages (Nov. 10, 2013).

\* cited by examiner

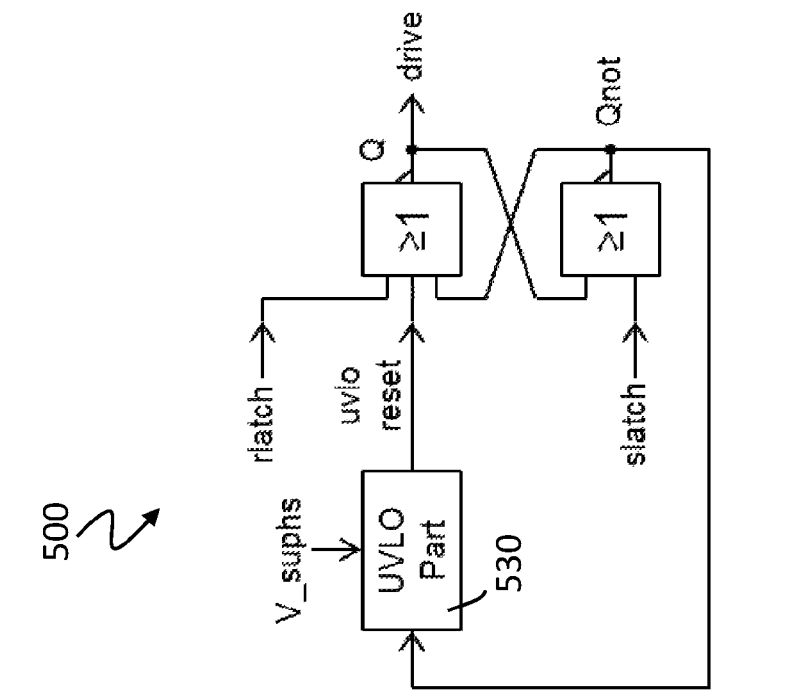
*Fig. 5*
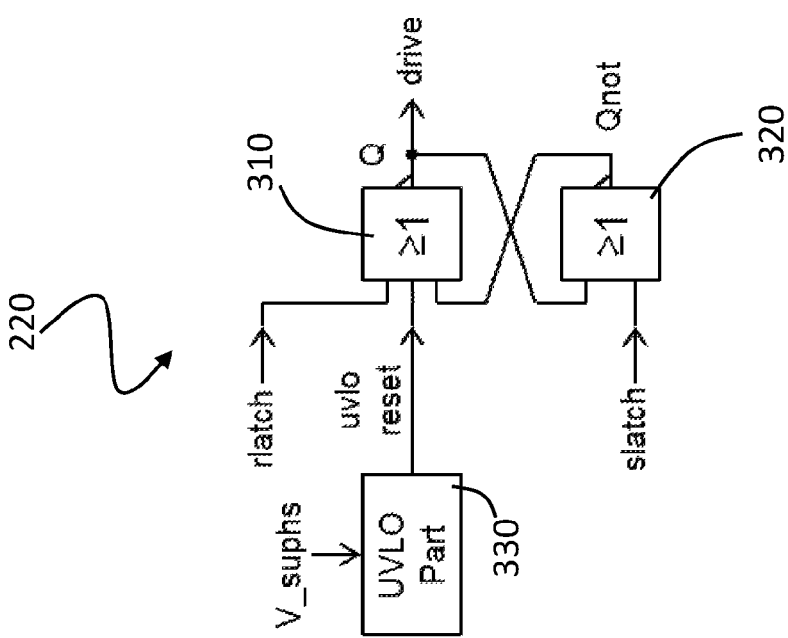
(Prior Art) *Fig. 3*

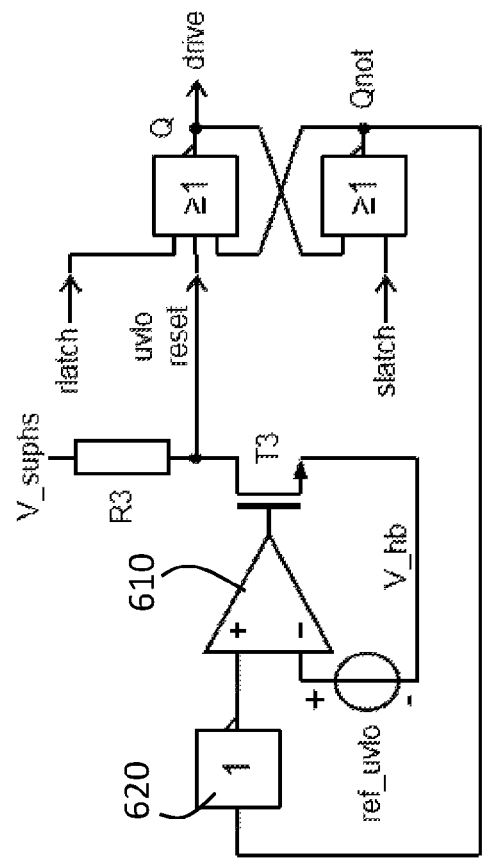
Fig. 6
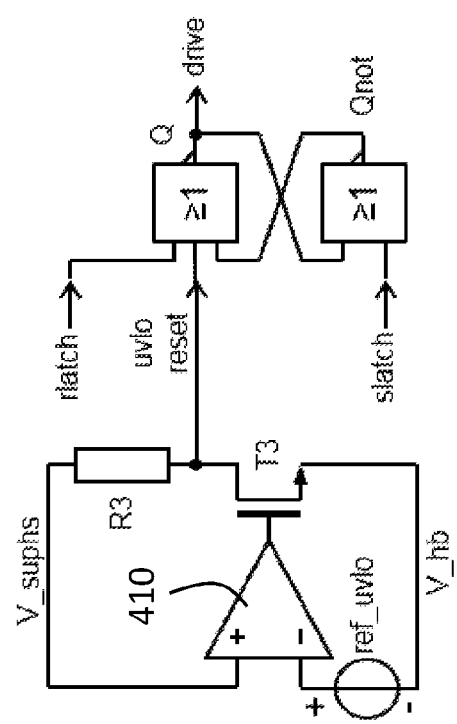
(Prior Art) Fig. 4

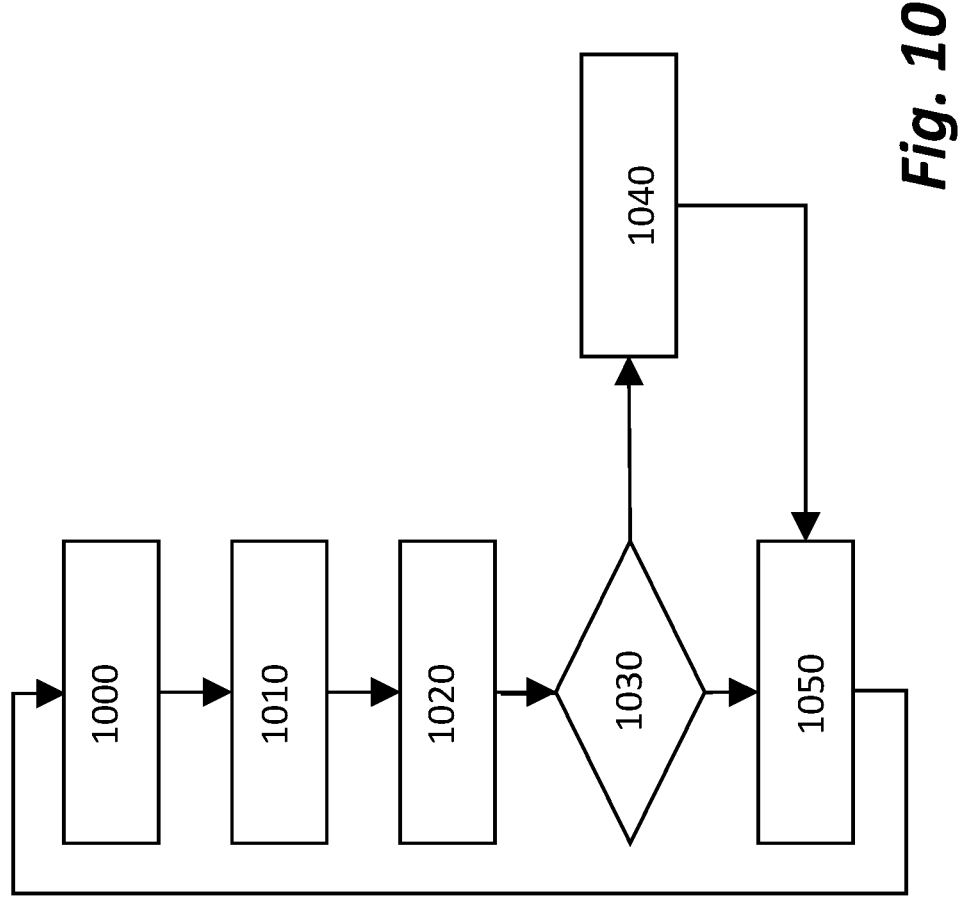

DC-DC CONVERTERS HAVING A HALF-BRIDGE NODE, CONTROLLERS THEREFOR AND METHODS OF CONTROLLING THE SAME

FIELD

The present disclosure relates to controllers for DC-DC converters having a half-bridge node, and methods of controlling the same.

BACKGROUND

Various DC-DC converters having a half-bridge node, arranged between a low-side switch (LSS) and a high-side switch (HSS) are known. Such converters are used, for example for powering compact fluorescent lighting, or adaptors for PC and TV applications and can be provided in various configurations, such as resonant converters, for example so-called LLC, or LCC converters. FIG. 1 shows a block diagram of an LLC converter. The controller 100 includes a high side part 110 and a low side part 120.

The controllers for such converters must be able to control the high-side switch and the low-side switch. Typically, to be able to control the HSS (shown in FIG. 1 as T1), even when the LSS is open, the high side part of the controller needs its own individual supply, which is normally realized from a capacitor, shown at C1 charged via a so-called bootstrap configuration: the capacitor is charged during the time the LSS (T2) of the converter is in ON state (that is to say, T2 is closed). During that time, the voltage at the half—bridge node (V_hb) is pulled low, so the capacitor can be charged from the supply voltage (V_suphs), which is supplied from the DC-power supply 130 through a diode D1.

The moment the LSS is switched OFF (that is to say, opened), these applications will intentionally lift the so called 'floating ground' level of the high side part 110 due to the inductive current (in the inductor L1), leaving its supply solely to the charged bootstrap capacitor. Now, the bootstrap capacitor C1 is discharged by the high side part drawing power to operate its various functions. Of course, the most fundamental of these is to open and close the HSS T1—which are transitory actions—but may include other functions. At the next cycle, the LSS is turned on again, connecting the half-bridge node to ground, and the bootstrap capacitor is recharged.

In some modes of operation, it may occur that the particular steady state where both the HSS and LSS are OFF for a longer period and the voltage at the half bridge node V_hb is floating, the bootstrap capacitor can be fully discharged by the high side part. Burst mode operation is such a mode, in which the HSS and LSS may both be OFF for a relatively long period, for example tens of milliseconds, typically up to around 100 ms. As a consequence, the system has to start by turning on the low side part to assure recharge of the bootstrap capacitor, before the high side part can provide proper control of the high-side switch. This may be undesirable.

SUMMARY

According to a first aspect of the present disclosure, there is provided a controller for a DC-DC converter comprising a series arrangement of a high-side switch and low-side switch with a half-bridge node therebetween, the controller comprising a high-side part for driving the high-side switch and configured to be powered, when the low-side switch is open, by a rechargeable power supply connected between the half-bridge node and a power supply node (V_suphs), the high-side part comprising a level shifter, a driver, a latch part comprising a latch having a set input (slatch) and a reset input (rlatch) and configured to latch the driver to either an on-state or an off-state, and a further circuit, wherein the latch part is configured and adapted to prevent the further circuit from drawing current from the power supply unless at least one of the set input is high and the driver is in the on-state. By preventing the further circuit from drawing current from the power supply, it may be possible to retain the charge in the power supply, such that, even though the power supply is connected, it is not drained or discharged. It may therefore be possible, to rely on the power supply when it is, later, decides to change the state of the highside switch. It may therefore be possible to enable a simpler operation of the DC to DC converter, and it may not be necessary to require that the DC-DC converter is restarted with the low side switch closed.

In one or more embodiments, the further circuit comprises an undervoltage lock-out circuit which is comprised in the latch part. In other embodiments, this further circuit may comprise, for instance, an over temperature protection circuit. Typically, such circuits and may draw current from the rechargeable power supply, absent measures, as described in here, to prevent current being drawn.

In one or more embodiments, latch further comprises a further reset input, a Q output and a Q-not output. In one or more embodiments the further reset input is coupled to an output of the undervoltage lock-out circuit (uvlo_reset). In other embodiments, for instance where the further circuit is an over temperature protection circuit, the further reset input may be coupled to the output of the over temperature protection circuit.

In one or more embodiments, the latch comprises a pair of cross-coupled NOR gates, a first one of the pair of NOR gate comprising the set input and the Q-not output, and a second one of the pair of NOR gates comprising the reset input, the further reset input and the Q output. Without limitation, in other embodiments, the latch may comprise a pair of cross-coupled NAND gates.

In one or more embodiments the undervoltage lock-out circuit comprises a comparator for comparing a threshold voltage difference (ref_uvlo) with a difference between a voltage at the half-bridge node and an inverted version of the Q-not output of the latch part: the inverted version of the Q-not output is equal to the V_suphs voltage when the high-side switch T1 is on.

In one or more embodiments the undervoltage lock-out circuit comprises a first MOS transistor (T3) having a source connected to the half-bridge node voltage and a drain connected to the power supply node via a biasing resistor (R3), and the latch part is configured and adapted to prevent the biasing resistor drawing current from the power supply unless at least one of the set input is high and the driver is in the on-state. In such embodiments, when the set input is high, the system activates the undervoltage lock-out circuit to verify if there is sufficient supply voltage. If there is not, the drive output remains low, and the undervoltage lock-out circuit remains active.

In one or more embodiments the comparator output is provided as the gate input to the first MOS transistor, and the undervoltage lock-out circuit is configured to ensure the further reset input is tied to the half-bridge node voltage, by turning on the first MOS transistor, in response to the voltage difference between the half-bridge node voltage and the inverted version of the Q-not outputs of the latch part exceeding the threshold voltage difference (ref_uvlo).

In one or more other embodiments the comparator comprises a second MOS transistor (T4) connected in a source-follower arrangement between the power supply node and the half-bridge node voltage via a resistor (R4), and the source terminal of the second MOS transistor is connected to the gate of the first MOS transistor, such that the threshold voltage difference is the sum of the threshold voltages of the first and second MOS transistors.

In yet one more further embodiments, wherein the undervoltage lock-out circuit comprises a first MOS transistor having a source connected to the half-bridge node voltage via one or more diodes and a drain connected to the power supply node via a biasing resistor, and the latch part is configured and adapted to prevent the biasing resistor drawing current from the power supply unless at least one of the set input is high and the driver is in the on-state. An inverted version of the Q-not output may be provided as a gate input to the first MOS transistor.

According to a further aspect of the present disclosure, there is provided a DC-DC converter comprising such a controller, the rechargeable power supply, the high-side switch and low-side switch an inductive element and a capacitive element. In one more embodiments the rechargeable power supply comprises a capacitor arrangement. The capacitor arrangement may be a single capacitor, or may for example be a parallel arrangement of a plurality of capacitors. The rechargeable power supply may be known as a bootstrap power-supply, and may typically take the form of as a bootstrap capacitor, or a bootstrap capacitor arrangement.

According to a yet further aspect of the present disclosure, there is provided a method of controlling a DC-DC converter comprising a series arrangement of a high-side switch and low-side switch with a half-bridge node therebetween, and a controller comprising a high-side part for driving the high-side switch, the high-side part comprising a level shifter; a driver; a latch part configured to latch the driver to either an on-state or an off-state, and a further circuit, the method comprising: sequentially closing and opening the high-side switch and the low-side switch, in sequence, charging a power supply connected between the half-bridge node and a supply node when the low-side switch is closed; providing power to the high-side part from the power supply when the low voltage switch is open; and preventing the further circuit from drawing current from the power supply unless at least one of the set input is high and the driver is in the on-state.

In one or more embodiments, the further circuit is an undervoltage lock-out circuit comprising a series arrangement of a switch and a biasing resistor and preventing the further circuit from drawing current comprises opening the switch to prevent current flowing through the biasing resistor.

In one or more embodiments, the further circuit is an undervoltage lock-out circuit comprising a series arrangement of a switch and a biasing resistor and the method comprises; in sequence, closing the low-side switch (1000); opening the low-side switch (1010); generating a pulse cur_pulse_on (1020), thereby setting a latch signal slatch high, and activating the undervoltage lock-out circuit;

determining, by means of the undervoltage lockout circuit, whether there is sufficient voltage to operate the high-side switch (1030); in response to there being sufficient voltage to operate the high-side switch, closing the switch to draw current through the biasing resistor thereby force or cause a further reset input to the latch (1040) low; and in response to there being insufficient voltage to operate the high-side switch, holding the switch open to force or cause the further reset input to the latch to be high and thereby prevent the high-side switch from operating (1050).

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which

FIG. 3 shows a block diagram of a conventional latch part with an undervoltage lock-out circuit;

FIG. 4 shows the conventional latch part of FIG. 3 in more detail;

FIG. 5 shows a block diagram of a latch part with an undervoltage lock-out circuit, according to one aspect of the present controller;

FIG. 6 shows the latch part of FIG. 5 in more detail;

FIG. 10 shows a flow diagram according to another aspect of the present disclosure.

Figure 1:
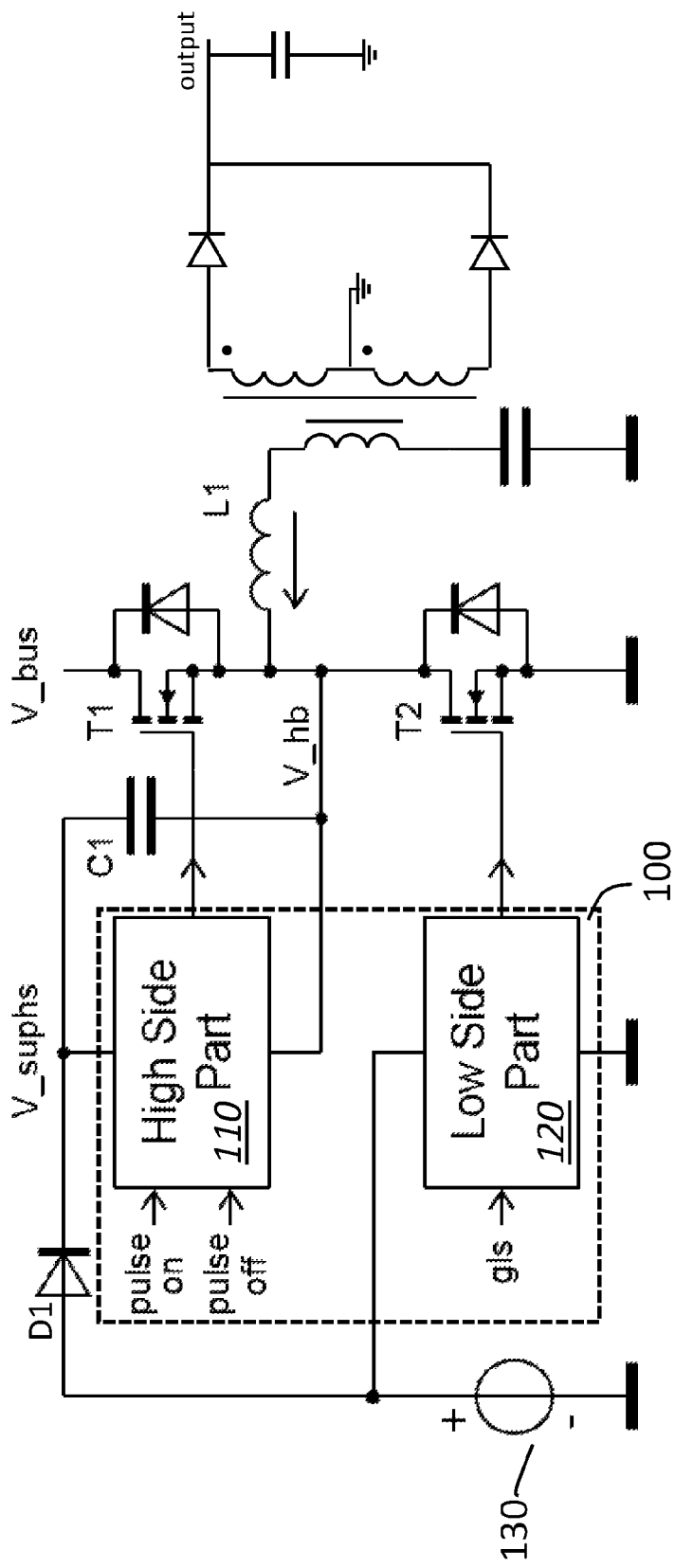
FIG. 1 illustrates a typical LLC resonant converter having a half-bridge node.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

Figure 2:
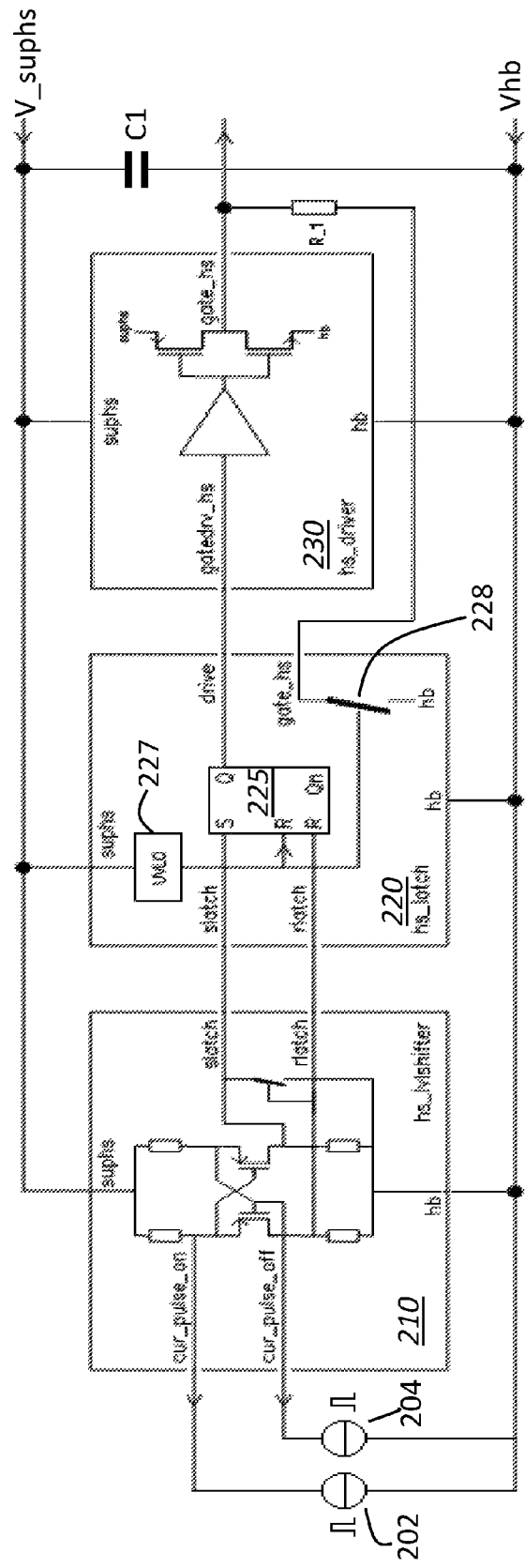
FIG. 2 shows a block diagram of a high side controller.

One way to avoid having to start the system with the low side part first, would be to prevent any current drain from the capacitor, except during the closing and opening of the HSS. In particular, it may be possible to provide a design in which there is no bias current during such a quiescent time. If case no biasing current is needed in the high side, the voltage on the bootstrap capacitor will remain the same and no discharge will take place. In this case it is possible to have both Half-bridge switches (T1 &T2) OFF for an extremely long period, while it is possible to start the conduction of T1 at any time with a input current 'pulse on'. However, this may limit functionality: for example, such converters include an undervoltage lock-out circuit, to prevent operation in the event that the input power supply does not have sufficient voltage to properly turn on the HSS (which is typically a MOSFET) to operate in the linear region, which in turn increases the power dissipation of the MOSFET, which may eventually fail; operation of an undervoltage lock-out circuit generally requires drawing current from the supply. Another example of a further circuit which can increase the functionality of the DC-DC converter is an over-temperature control protection circuit. Once again, operation of such a circuit usually requires drawing current from the supply A typical high side part 110 of a controller 100 is shown in FIG. 2. The highside part has three main elements: a level shifter 210, a latch part 220, and a driver 230. The logic part of the controller (not shown) supplies "on" (cur_pulse_on) and "off" (cur_pulse_off) current pulses, 202 and 204 respectively, to the level shifter 210, in order to change the state of the high-side switch. The level shifter shifts the voltage level of the current pulses, as will be familiar to the skilled person, and that forwards firm as "set" and "reset" signals to the latch part 220. The latch part 220 comprises an S-R latch 225, having a set input slatch and a reset input rlatch, and outputs Q and Qnot. The latch part 220 includes additional functionality, which may be as shown and undervoltage lockout circuit 227. The latch part 220 may include a gate switch, as shown at 228, in order to tie the gate of the high-side switch to the voltage at the half bridge node when operating at a low supply voltage; typically the state is defined by the driver which may not operate properly under conditions of a low supply voltage. The latch part 220 provides an output (shown as "drive"), being the output queue from the latch, to the driver part. The driver part buffers and amplifies the Q output (drive), to drive the highside switch, as will be familiar to the skilled person. Also shown in FIG. 2 is the bootstrap capacitor C1 which, as shown, is connected between the half bridge node voltage Vhb, and the power supply voltage V_suphs. As discussed above, power supply voltage is connected via a diode to to the DC-DC converter input which in use is connected to a DC power supply (not shown). When the low side switch (not shown,) is closed, the DC power supply can then power the high side part of the controller. However, when the low side switch is open, there is no return path back to the DC power supply; at such time, the power for the highside part comes from capacitor C1, which as shown, is connected between the half bridge rail or node and the power supply rail or node suphs, at voltage V_suphs.

Most of the circuits used in the high side part don't need a biasing current in a steady state. The level shifter circuit 210 shown in FIG. 2 only draws some current from the high side supply V_suphs during the relatively short time that either the ON or OFF current pulse is applied at its input. Also the driver 230 will not draw any current in a fixed high or low state, but only during low-to-high and high-to-low transitions when some cross current can occur. In the latch part 220 however in most case a continuous bias current is present both during the ON and OFF state, and during switching between the two states, in the undervoltage lock-out circuit. A bias current is required to correctly operate an undervoltage lock-out circuit. An undervoltage lock-out circuit measures the supply voltage V_suphs, relative to the floating ground—that is to say, the voltage Vhb at the half-bridge node. This voltage difference is compared with a reference voltage, and provided the voltage difference is adequate, the controller is allowed to operate; however, in case the voltage is less than the predetermined reference voltage, the controller is "locked out". There are several known methods of providing an undervoltage lock-out circuit, but the most convenient require a bias current for proper operation.

A conventional latch part 220 including an undervoltage lock-out circuit 330 is shown, in block form, in FIG. 3. The latch is an S-R latch (having set input slatch and reset input rlatch, and outputs and Qnot) realized with a pair of cross-coupled NOR gates, 310 and 320, with an extra reset input uvlo_reset for under-voltage level detection. The undervoltage lock-out circuit is supplied from and detects the voltage of, the high side supply voltage, V_suphs, and produces the further reset input uvlo-reset to the start latch.

FIG. 4 shows such a conventional latch part in more detail. In particular, the undervoltage lock-out part is shown as an NMOS transistor T3 in series with a biasing resistor R3. The gate of NMOS transistor T3 is supplied by the output of a comparator 410. In this circuit, there is a continuous current drain through R3 and transistor T3 as long as the supply voltage V_suphs is above the undervoltage lock-out reference level (ref_uvlo) applied to the comparator. In this case the further reset input signal level presented as an additional reset input to the S-R latch (uvlo_reset) will be low (logic '0'), that is to say, it is tied to the half bridge node voltage V_hb. If the supply voltage drops below this reference level, the transistor T3 will be switched OFF, the drain of T3 goes high, to the supply voltage V_suphs, and the presented uvlo_reset signal will be high (logic '1') resetting the S-R latch. It will be appreciated by the skilled person that all the digital logic gates shown, always have their supply between V_suphs (as VDD level) and V_hb (as VSS level). These supplies are not shown, in order not to unnecessarily complicate the figures.

FIG. 5 shows a block diagram of a latch part according to one aspect of the present disclosure. FIG. 5 is similar to FIG. 3, except that the undervoltage lockout circuit 530 has an additional input, from the Q not output of the latch.

The components in the undervoltage lock-out circuit contain the level detector and, in addition, include circuitry to switch off the bias current in case the Qnot output of the latch is high; the Qnot output will be high when the drive output of the latch is low, and the latch input being low as well, indicating that there are no cur_pulse_in signals (see FIG. 1). The Qnot output is used to enable the undervoltage lock-out circuit when Qnot is low; the undervoltage lock-out circuit remains active all the while the Qnot is low. Conversely, as long as Qnot is high, the undervoltage lock-out circuit is switched off. Thus during any long "waiting period", for example between bursts, without any switching pulses (cur_pulse_on and cur_pulse_off) and both the HSS and LSS are open, the undervoltage lock-out circuit is switched off and may not draw current. During any other period, it may be allowed to draw current.

An example embodiment, of the latch part shown in FIG. 5, is shown in more detail in FIG. 6. Similarly to the conventional undervoltage lockout circuit, the circuit comprises an NMOS transistor T3, coupled between the half bridge voltage V_hb and the highside supply voltage V_suphs via a biasing resistor R3. The gate of the transistor is connected to the output of a comparator 610. One side of the comparison is the reference level ref_uvlo. However, the other side of the comparator is not connected to the highside supply node at V_suphs, but to an inverted version of the Qnot output of the latch.

Now, in the event that Qnot is low, its inverted version will be at the supply voltage (V_suphs), which supply voltage also supplies the invertor 620 (not shown, for clarity). Then the transistor T3 will be ON provided that the difference between the half-bridge node voltage and the supply voltage (V_suphs) is at least, or exceeds, the threshold voltage difference (ref_uvlo); thus there will still be a current drawn from the supply V_suphs. However as soon as either of two events occurs, the drive output will be low, and current will no longer be drawn from V_suphs by the biasing resistor. One of these two events is that the controller logic provides a current-off pulse to open the highside switch: that is to say 'rlatch' is high (logic '1'). The other of the two events is that the voltage V_suphs on the output of the inverter drops below the reference level of the comparator causing 'uvlo_reset' to be high (logic '1').

Each of these two events provides a reset signal to the latch, and in consequence the drive output Q will be low. Furthermore, as long as 'slatch' is low (logic '0') and the drive output is low (logic '0'), Qnot will be high and via the inverter 620 and comparator 610, the gate of T3 will be held low, such that T3 will be in the OFF state so no current will be drawn anymore from V_suphs.

This control loop situation will hold itself in this state and can only be changed into a drive output being high again when 'slatch' changes from low to high, provided the voltage presented on the comparator is above the uvlo reference level. Thus, it is shown that the Qnot output of the latch can be used, to suppress, or prevent, any bias current, when the drive output is low (that is to say, when the high switch is off), unless the set input to the latch is or goes high. In other words, the latch part is configured and adapted to prevent the further circuit from drawing current from the power supply unless at least one of the set input is high and the driver is in the on-state.

Figure 7:
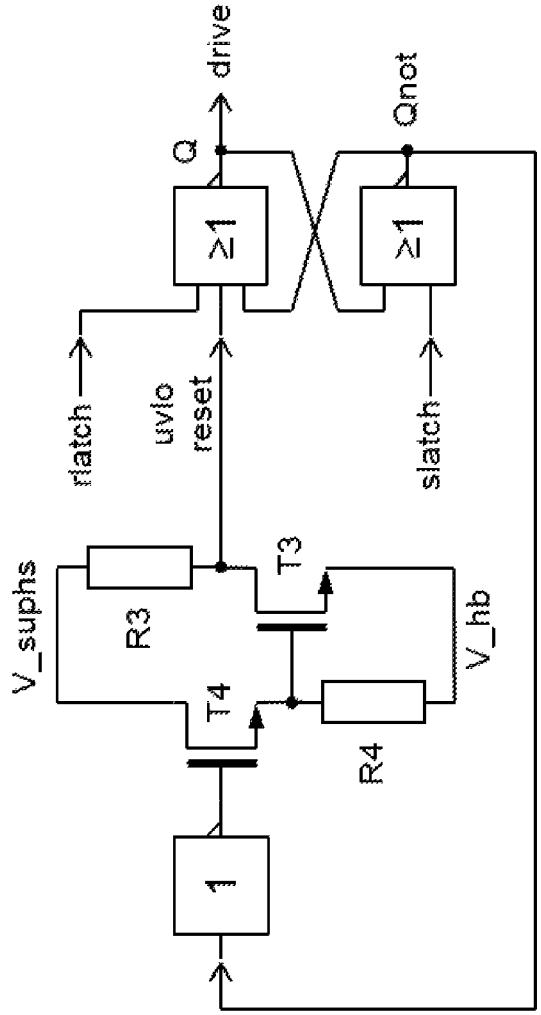
FIG. 7 shows another latch part according to the present disclosure.

Another latch part according to the present disclosure is shown in FIG. 7. In this and other similar embodiments, the comparator and reference voltage shown in 6 has been replaced by a source follower NMOS transistor T4 with source resistor R4. The actual reference level, to trigger the undervoltage lockout, in this case is the sum of the threshold voltages of T3 and T4. In one or more other embodiments, a series diode in series with the source of T4 may be included, to increase this reference level. In some embodiments a reference level which is at least two times the threshold level of a single NMOS transistor, may be selected to support correct functioning of the digital logic. It will be appreciated that such a circuit will draw a bit relatively higher current in the case that the drive output is in the high state, since current flows through both resistors R3 and R4, still in the case that the drive output is in the low state and set signal 'slatch' is low, the circuit does not draw current from supply V_suphs.

Figure 8:
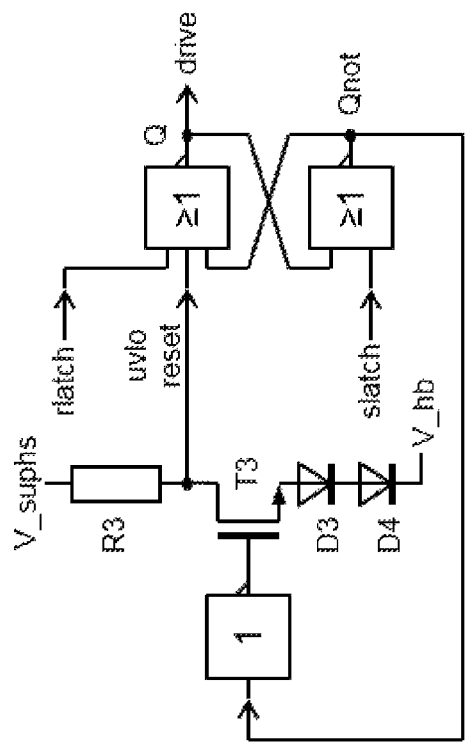
FIG. 8 shows yet another latch part according to the present disclosure.

Yet another latch part according to the present disclosure is shown in FIG. 8. The circuit is generally similar to the embodiment shown in FIG. 6; however, in this case the comparator is replaced by a pair of diodes D3 and D4 which are connected in series with the source of the transistor T3. The reference level in this case is the sum of the threshold voltage of T3 (Vgs_T3) and the forward voltage drop across each of the diodes (V_D1+V_D2). Provided the voltage at the power supply node, V_suphs, exceeds the half-bridge node voltage V_hb by at least V_D1+V_D2+Vgs_T3, and the inverted version of Qnot, being V_suphs, then the undervoltage lock-out reset signal is low, (ie uvlo-reset=low). Otherwise, if either Qnot is high such that the inverted signal is low and T3 switched off, or the voltage V_suphs does not exceed the half-bridge node voltage (V_hb) by at least V_D1+V_D2+Vgs_T3, then uvlo_reset is high and the operation is locked out.

Figure 9:
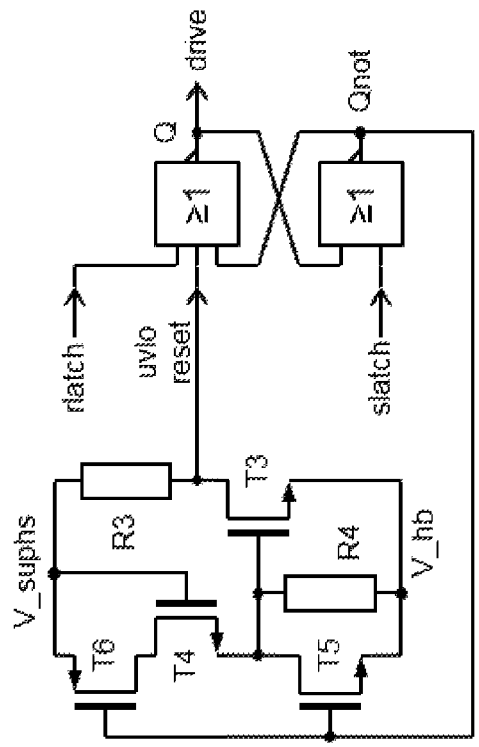
FIG. 9 shows a further latch part according to the present disclosure.

FIG. 9 shows a further latch part according to the present disclosure. The circuit is similar to that shown in FIG. 6, except that, in this circuit, the inverter 620 and comparator 610 are replaced by a PMOS transistor T6 and an NMOS transistor T5, along with control transistor T4. T6 and T5 are connected as switches in series between the supply rail suphs and a half bridge node, with the NMOS transistor T4 as a further switch therebetween. A further bias resistor R4 is connected across T5.

In this and similar embodiments, transistor T5 and T6 work as an inverter. In order to better understand the operation of the undervoltage lockout circuit of the latch part in FIG. 9, first consider the case that Qnot is high (that is to say, '1'): then T5 is on and T6 is off, and so the gate of T3 is pulled low (that is to say, '0') through R4, and uvlo_reset is high or '1'. So when the drive is off (Qnot is high or '1') the circuitry is disabled and uvlo reset is high or '1'. Conversely, when Qnot is low or '0' (corresponding to the situation in which either slatch='1' or drive='1') transistor T5 is off and T6 is on. However, now via T4 and T3 the voltage between V_suphs and V_hb) needs to be at least two threshold levels before transistor T3 is on and capable to make uvlo_reset='0'. So T4 is there to assure that uvlo_reset is only zero when the voltage difference between V_suphs and V_hb is at least two threshold levels.

A method of controlling a DC-DC converter as described above, according to a further aspect of the present disclosure, is shown in FIG. 10. The method comprises, at 1000, opening the high-side switch and closing the low-side switch. During this period a power supply connected between the half-bridge node (which is close to zero as the low-side switch is on) and a supply node is charged. The power supply may typically be a capacitor or a capacitor arrangement of, for example, two capacitors in parallel. At 1010 the low-side switch is opened and due to the inductive element in a resonant circuitry, the voltage at the half bridge node then increases to close to the input voltage of the DC-DC converter. The resonant current will flow through the backgate diode of the high side MOSFET (T1). The high side circuitry is then being supplied from the bootstrap capacitor C1.

At 1020, the control logic would like to turn on the high-side switch and a cur pulse_on_signal (see FIG. 1) is generated. As a result the signal slatch becomes a logic '1'. The inverted Qnot output becomes a logic '1' and the undervoltage lock-out circuitry is activated. In other embodiments, in addition or alternative to the undervoltage lock-out circuitry, other circuitry such as an overtemperature protection is activated by the inverted Qnot signal.

At 1030 it is checked if there is at least a voltage difference of ref_uvlo between the V_suphs and V_hb. If "no", the uvlo_reset signal will remain high (logic '1') and the drive output will be kept low (logic '0') keeping the high side switch off (shown at step 1050). Conversely, if "yes", the uvlo_reset signal will be low (logic '0') and the drive output will be '1', turning on the high side switch (shown at step 1040). If, in this state, either (a) the voltage difference between V_suphs and V_hb drops below the ref_uvlo level or (b) the rlatch signal becomes a logic '1', then the high side switch is turned off (shown as step 1050).

Due to the inductive element in the resonant circuitry, the voltage at the half bridge node then decrease to close to zero. The resonant current will flow through the backgate diode of the low side switch (T2). The control logic will then again turn on the low side switch, as shown in (1000), to repeat the cycle.

Thus in the states following steps 1020, 1030, 1040 a current is drawn from the power supply. As the system is in state 1010 or 1050 during the long off period, the supply voltage remains during these long off periods as no current is drawn in these period.

From reading the present disclosure, other variations and modifications will be apparent to the skilled person. Such variations and modifications may involve equivalent and other features which are already known in the art of controllers for DC-DC converters, and which may be used instead of or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

LIST OF REFERENCE SIGNS 100 controller
110 High side Part
120 Low side Part
130 DC-power supply
202 cur_pulse_on
204 cur_pulse_off
210 level shifter
220 latch part
225 latch
227 undervoltage lockout circuit
228 switch
230 driver
310 NOR gate
320 NOR gate
330 undervoltage lockout circuit
410 comparator
530 undervoltage lockout circuit
610 comparator
620 inverter

The invention claimed is:

1. A controller for a DC-DC converter comprising a series arrangement of a high-side switch and low-side switch with a half-bridge node therebetween,
the controller comprising a high-side part for driving the high-side switch and configured to be powered, when the low-side switch is open, by a rechargeable power supply connected between the half-bridge node and a power supply node,
the high-side part comprising a level shifter, a driver, a latch part comprising a latch having a set input and a reset input and configured to latch the driver to either an on-state or an off-state, and a further circuit,
wherein the latch part is configured and adapted to prevent the further circuit from drawing current from the power supply unless at least one of the set input is high and the driver is in the on-state.

2. The controller as claimed in claim 1, wherein the further circuit comprises an undervoltage lock-out circuit which is comprised in the latch part.

3. The controller as claimed in claim 1 wherein the latch further comprises a further reset input, a Q output and a Q-not output.

4. The controller as claimed in claim 2, wherein a further reset input is coupled to an output of the undervoltage lock-out circuit.

5. The controller as claimed in claim 3, wherein the latch comprises a pair of cross-coupled NOR gates, a first one of the pair of NOR gate comprising the set input and the Q-not output, and a second one of the pair of NOR gates comprising the reset input, the further reset input and the Q output.

6. The controller as claimed in claim 2, wherein the undervoltage lock-out circuit comprises a comparator for comparing a threshold voltage difference with a difference between a voltage at the half-bridge node and an inverted version of the Q-not output of the latch part.

7. The controller as claimed in claim 2, wherein the undervoltage lock-out circuit comprises a first MOS transistor having a source connected to the half-bridge node voltage and a drain connected to the power supply node via a biasing resistor, and the latch part is configured and adapted to prevent the biasing resistor drawing current from the power supply unless at least one of the set input is high and the driver is in the on-state.

8. The controller as claimed in claim 7, wherein the comparator output is provided as the gate input to the first MOS transistor, and the undervoltage lock-out circuit is configured to ensure the further reset input is tied to the half-bridge node voltage, by turning on the first MOS transistor, in response to the voltage difference between the half-bridge node voltage and the inverted version of the Q-not outputs of the latch part exceeding a threshold voltage difference.

9. The controller as claimed in claim 7, wherein a comparator comprises a second MOS transistor connected in a source-follower arrangement between the power supply node and the half-bridge node voltage via a resistor, and the source terminal of the second MOS transistor is connected to the gate of the first MOS transistor, such that the threshold voltage difference is a sum of the threshold voltages of the first and second MOS transistors.

10. The controller as claimed in claim 1, wherein the undervoltage lock-out circuit comprises a first MOS transistor having a source connected to the half-bridge node voltage via one or more diodes and a drain connected to the power supply node via a biasing resistor, and the latch part is configured and adapted to prevent the biasing resistor drawing current from the power supply unless at least one of the set input is high and the driver is in the on-state.

11. The controller as claimed in claim 10, wherein an inverted version of the Q-not output is provided as a gate input to the first MOS transistor.

12. A DC-DC converter comprising the controller as claimed in claim 1 and an inductive element.

13. The DC-DC converter as claimed in claim 12, wherein the rechargeable power supply comprises a capacitor arrangement.

14. A method of controlling a DC-DC converter comprising a series arrangement of a high-side switch and low-side switch with a half-bridge node therebetween, and a controller comprising a high-side part for driving the high-side switch, the high-side part comprising a level shifter, a driver, a latch part configured to latch the driver to either an on-state or an off-state, and a further circuit,
the method comprising:
sequentially closing and opening the high-side switch and the low-side switch, alternately, charging a power supply connected between the half-bridge node and a supply node when the low-side switch is closed;

providing power to the high-side part from the power supply when the low-side switch is open;

and preventing the further circuit from drawing current from the power supply unless at least one of the set input is high and the driver is in the on-state.

15. The method of claim 14, wherein the further circuit is an undervoltage lock-out circuit comprising a series arrangement of an undervoltage lock-out switch and a biasing resistor and the method comprises, in sequence, closing the low-side switch;

opening the low-side switch;

generating a pulse cur_pulse_on, thereby setting a latch signal slatch high, and activating the undervoltage lock-out circuit;

determining, by means of the undervoltage lockout circuit, whether there is sufficient voltage to operate the high-side switch;

in response to there being sufficient voltage to operate the high-side switch, closing the undervoltage lock-out switch to draw current through the biasing resistor thereby force a further reset input to the latch low; and in response to there being insufficient voltage to operate the high-side switch, holding the undervoltage lock-out switch open to cause the further reset input to the latch to be high and thereby prevent the high-side switch from operating.

* * * * *